United States Patent [19]
Forrester

[11] Patent Number: 5,403,148
[45] Date of Patent: Apr. 4, 1995

[54] BALLISTIC BARRIER FOR TURBOMACHINERY BLADE CONTAINMENT

[75] Inventor: James M. Forrester, Centerville, Ohio

[73] Assignee: General Electric Company, Cincinnati, Ohio

[21] Appl. No.: 116,634

[22] Filed: Sep. 7, 1993

[51] Int. Cl.6 .............................................. F01D 21/00
[52] U.S. Cl. .......................................... 415/9; 415/200
[58] Field of Search ........................... 415/9, 197, 200

[56] References Cited

U.S. PATENT DOCUMENTS

| | | | |
|---|---|---|---|
| 4,534,698 | 8/1985 | Tomich | 415/9 |
| 4,547,122 | 10/1985 | Leech | 415/9 X |
| 4,818,176 | 4/1989 | Huether et al. | 415/9 X |
| 5,188,505 | 2/1993 | Schilling et al. | 415/9 |
| 5,259,724 | 11/1993 | Liston et al. | 415/9 X |

Primary Examiner—Edward K. Look
Assistant Examiner—Michael S. Lee
Attorney, Agent, or Firm—Jerome C. Squillaro; David L. Narciso

[57] ABSTRACT

An improved containment casing for use with turbomachinery, such as turbofan engines. The containment casing is provided with a ballistic barrier composed of ceramic composite tiles which promotes the ability of the containment casing to withstand an impact from a fan blade which is released within the casing. The barrier is sufficiently hard so as to resist the cutting action of the fan blade, as well as to dull the edge of the fan blade so as to minimize subsequent damage to the containment casing and engine. The barrier serves to distribute the impact of the fan blade, so as to reduce the likelihood of piercing or severing the containment casing.

14 Claims, 2 Drawing Sheets

BALLISTIC BARRIER FOR TURBOMACHINERY BLADE CONTAINMENT

The present invention relates to turbomachinery and the manner in which structural damage due to blade release is minimized with such machinery. More particularly, this invention relates to a barrier which can be secured to the containment casing of turbomachinery, such as a turbofan engine, for the purpose of more reliably containing a fan blade upon release.

BACKGROUND OF THE INVENTION

Numerous applications exist for turbomachinery, such as turbochargers used in automotive applications and gas turbine engines utilized in various military and aerospace vehicles. An example is the turbofan engine, which is used to propel aircraft at subsonic and supersonic speeds. For subsonic speeds, high bypass turbofan engines are often employed. These engines include a large fan which is typically placed at the front of the engine. The fan serves to produce greater thrust and reduce specific fuel consumption. As with most turbomachinery, such fans are circumferentially enclosed by a containment casing which is specifically designed to be capable of containing a fan blade in the event that the fan blade is released from its hub during operation. As a result, the containment casing is able to minimize the structural damage to the engine and aircraft if one or more fan blades are released from the hub due to a catastrophic failure of one or more blades.

A unique problem arises when a fan blade is released during the operation of the engine in a manner that causes the fan blade to strike the containment casing in a region forward of the fan, as illustrated in FIG. 1. Such an event is likely to occur when a first blade fails and strikes a second trailing blade such that the second blade is propelled forward from the fan. Fan blades released in this manner are more difficult to contain than when a released blade remains within the plane of the fan because, as shown in FIG. 1, the resulting impact is relatively localized. Typically, under such circumstances essentially all of the kinetic energy of the fan blade is dissipated at the aft corner of the blade. As a result, the blade is more apt to inflict severe damage to the containment casing and the engine, and is likely to pass completely through the containment casing. In contrast, if the blade remains within the plane of the fan, the entire chord length of the blade tip is generally impacted against the containment casing, enabling the kinetic energy of the blade to be more evenly distributed at the surface of the containment casing. Consequently, the blade is less likely to pierce the containment casing, such that the blade will remain contained within the containment casing.

Conventional containment casings are typically a solid metal casing having a thickness sufficient to withstand the impact of a fan blade within the plane of the fan. Protection provided by an outer shell formed from KEVLAR has also been used, for the purpose of exterior containment. However, blade containment achieved by these methods generally incurs significant additional weight, and/or does not sufficiently protect the interior surface of the containment casing, and/or does not offer sufficient protection to the containment casing forward of the fan, particularly in the event of a fan blade being propelled forward of the fan as described above.

Accordingly, it would be advantageous to provide an improved containment casing for turbomachinery, such as turbofan engines used in aerospace applications, wherein an interior protective barrier is provided for the containment casing so as to enhance the ability of the containment casing to withstand an impact by a released fan blade. Preferably, such a barrier would provide additional protection to the forward section of such machinery, and incur minimal additional weight.

SUMMARY OF THE INVENTION

It is therefore an object of this invention to provide a containment casing for turbomachinery which is made more readily capable of withstanding an impact by a fan blade, particularly in the region of the containment casing which is forward of the fan.

It is a further object of this invention that such a containment casing include a protective barrier which can more readily distribute and dissipate a localized impact by a fan blade, so as to minimize the damage to the containment casing and the turbomachinery.

It is yet a further object of this invention that such a protective barrier be better able to resist the cutting action of such a fan blade.

It is another object of this invention that such a protective barrier be capable of dulling the fan blade upon impact so as to further minimize damage to the containment casing.

It is yet another object of this invention that such a protective barrier contribute minimal additional weight to the turbomachinery.

In accordance with a preferred embodiment of this invention, these and other objects and advantages are accomplished as follows.

According to the present invention, there is provided a protective barrier for the containment casing of turbomachinery, such as a gas turbine engine. More specifically, the barrier is positioned on the interior surface of the containment casing to serve as a ballistic barrier in the event that a blade of the turbomachinery is released. Preferably, and particularly in the case of a turbofan engine, the barrier is positioned in the region axially forward of the fan, and serves to minimize the damage to the forward section of the containment casing when a fan blade is released and propelled in a forward direction from the fan. The barrier is formed from a material which is sufficiently hard to resist the impact of the fan blade. The barrier serves to deflect and distribute the force of the impact, such that the containment casing is more readily able to withstand a highly localized impact delivered by a corner of a fan blade. The barrier also serves to dull the fan blade upon impact, so as to further minimize the damage inflicted by the fan blade to the containment casing.

Most preferably, the barrier is formed by securing a number of tiles to the interior surface of the forward section of the containment casing. When mounted to the casing, the tiles form a substantially continuous barrier layer over the interior surface forward of the fan. When struck by a fan blade, one or more tiles impacted by the blade serve to distribute the impact, so as to enhance the ability of the containment casing to withstand the impact. The tiles are sacrificial to the extent that, if damaged or destroyed, such tiles can be individually replaced. The use of the tiles is compatible with typical structure and design configurations of turbofan engines, and can accommodate acoustic liners which are typically installed in the forward section of the containment casing.

An advantage of the present invention is that the tiles are formed from a hard material, such as a ceramic composite, which promotes the ability of the tiles to distribute a highly localized impact inflicted by a fan blade. Preferably, the tiles are also sufficiently hard so as to resist the cutting action of the fan blade, and such that the impacted tiles are able to dull the corner of the fan blade so as to reduce the ability of the fan blade to pierce the containment casing.

In accordance with this invention, the above advantages are realized with tiles which can be readily secured to the interior surface of the containment casing using known adhesives. In addition, the suitable material for the tiles can be selected to have a minimal density, so as to contribute minimal additional weight to the turbofan engine.

Other objects and advantages of this invention will be better appreciated from the following detailed description.

DETAILED DESCRIPTION OF THE INVENTION

The present invention provides an improved containment casing for use in turbomachinery, and in particular turbofan engines. In accordance with this invention, the containment casing is provided with a ballistic barrier which promotes the ability of the containment casing to withstand a localized impact from a fan blade which is released from its hub. The barrier performs this function by distributing the impact of the fan blade, so as to reduce the likelihood of piercing or severing the containment casing. The barrier is also sufficiently hard so as to resist the cutting action of the fan blade, as well as dull the edge of the fan blade such that subsequent damage to the containment casing and engine is minimized.

Figure 1:
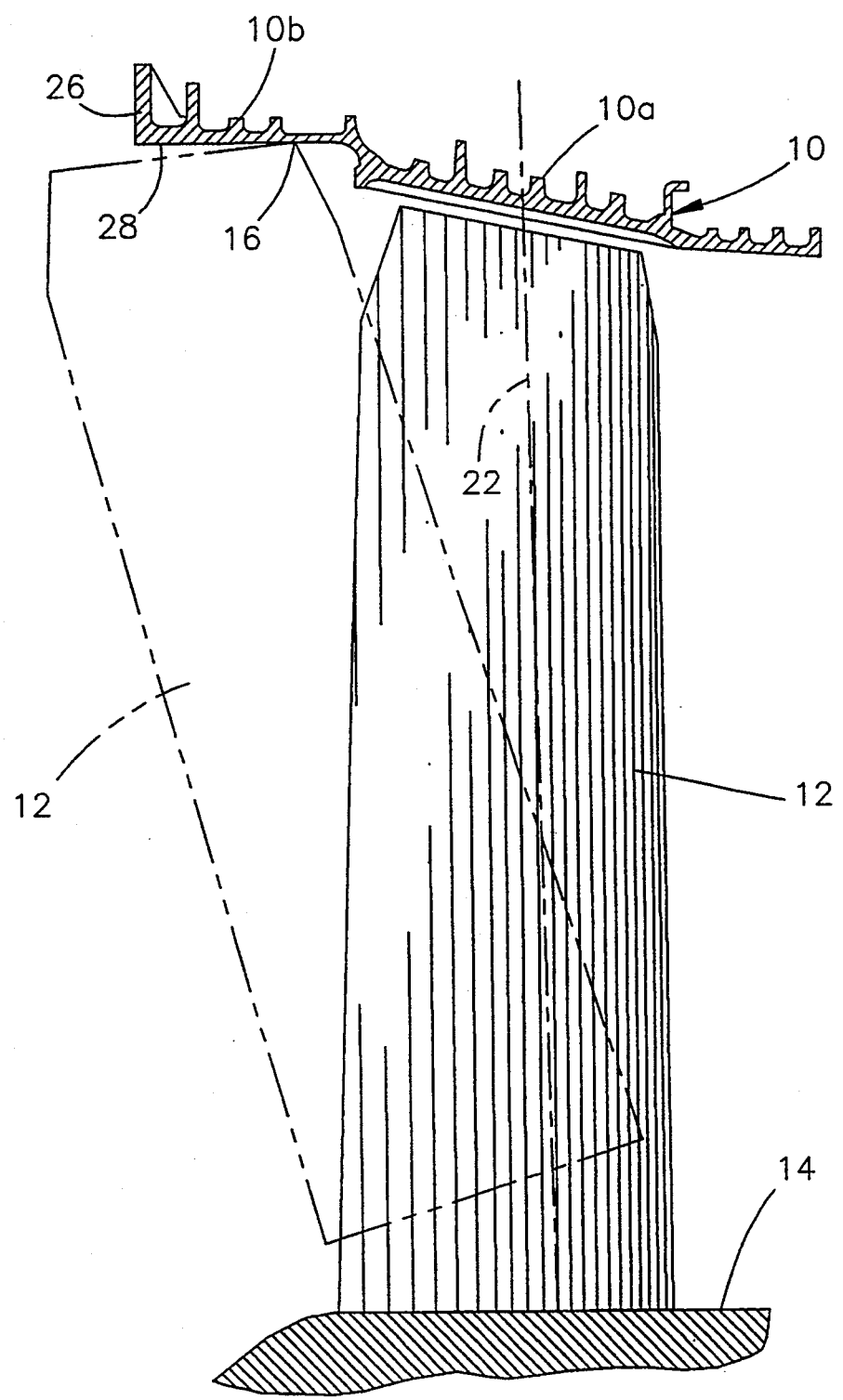
FIG. 1 is a representation in partial cross-section of a fan blade of a turbofan engine which has been released from its hub so as to be propelled in a forward direction relative to the axis of the turbofan engine.

In turbofan applications, the scenario for which the ballistic barrier of this invention is particularly intended is illustrated in FIG. 1. A containment casing 10 is shown as circumscribing a fan blade 12 mounted to a hub 14. The fan blade 12 rotates within the plane of the fan 22, which is perpendicular to the axis of the turbofan engine represented in FIG. 1. As can be seen, the axial profile of the tip of the fan blade 12 corresponds to the contour of the adjacent section of the containment casing 10, hereinafter referred to as the aft section 10a of the containment casing 10. Accordingly, in the event that the fan blade 12 is released by fracturing or otherwise becoming detached from the hub 14, the impact of the fan blade 12 will generally be distributed over the entire chord length of the fan blade 12 if the fan blade 12 remains in the plane of the fan 22. Under such circumstances, the potential for serious damage to the containment casing 10 is generally reduced by the structural and mechanical design of the containment casing 10.

However, if the fan blade 12 is propelled forward of the plane of the fan 22, the aft corner 16 of the fan blade 12 is very likely to impact the forward section 10b of the containment casing 10, as shown in phantom in FIG. 1. In such an event, the impact will be highly localized, which significantly increases the potential for severe damage to the containment casing 10, as well as the engine.

Figure 2:
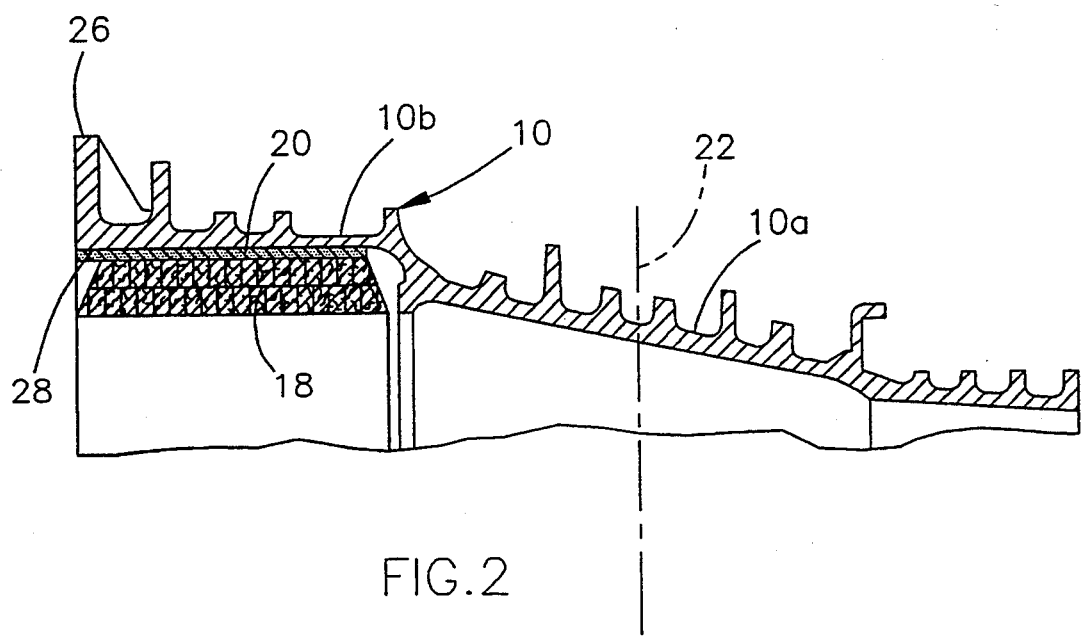
FIG. 2 is a partial cross-sectional view of a containment casing in accordance with a preferred embodiment of this invention.
Figure 3:
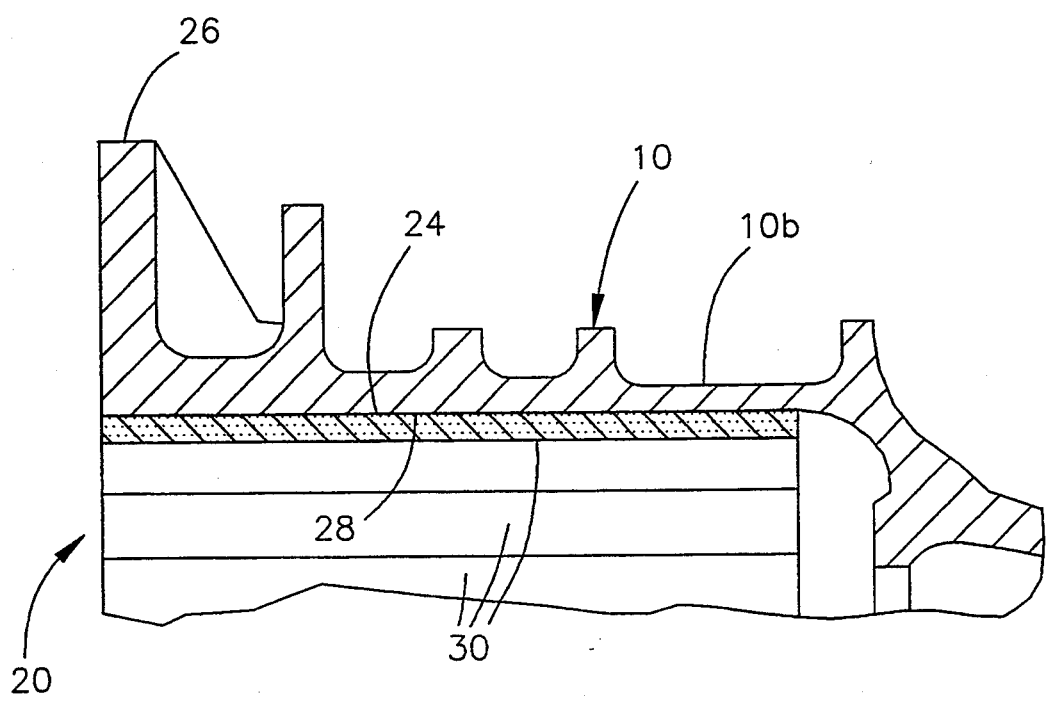
FIG. 3 is a more detailed view of FIG. 2 showing a barrier tile in cross-section.

To avoid the consequences of such an event, a ballistic barrier 20 in accordance with this invention is included with the containment casing 10, as shown in FIG. 2 and 3. In the preferred embodiment, the barrier 20 is secured to at least the forward section 10b of the containment casing 10, which is located between the aft section 10a and the forward flange 26 of the containment casing 10. FIG. 2 illustrates the barrier 20 as being disposed within a recess 28 formed in the forward section 10b. The barrier 20 is sandwiched between the containment casing 10 and an acoustic liner 18 of the type conventionally used in turbofan engines. FIG. 3 omits the acoustic liner 18 so as to provide a more detailed view of the barrier 20. Though the barrier 20 is illustrated as being limited to the forward section 10b of the containment casing 10, it is foreseeable that the aft section 10a of the containment casing 10 could be similarly protected, as well as other regions of the engine.

As shown, the barrier 20 is composed of a number of elongated tiles 30 which are abutted side by side so as to form a substantially continuous barrier over the interior circumferential surface of the forward section 10b. Most preferably, the tiles 30 are formed from a ceramic composite material characterized by a hardness and compressibility which is much greater than that of the metal from which the containment casing 10 is formed, which is conventionally but not limited to an aluminum alloy or stainless steel. Generally, the preferred ceramic composite material is characterized by a hardness and compressibility which enables the barrier 20 to withstand the impact of the fan blade 12 and resist the cutting action of the fan blade 12. However, it is foreseeable that softer materials could be used for some applications, as long as the material is suitably capable of withstanding the kinetic energy transferred by the fan blade 12, so as to protect the surface of the underlying metal.

A preferred ceramic composite material is composed of silicon carbide (SiC) particles within an aluminum oxide ($Al_2O_3$) matrix, as is known in the art. Such tiles 30 can be formed by pressing a suitable quantity of silicon carbide powder so as to form a preform, which is then placed on a quantity of aluminum. The aluminum is subsequently melted in air, thereby reacting with oxygen to form aluminum oxide, which then wicks up into the silicon carbide preform so as to form a matrix surrounding the silicon carbide particles. Preferably, the silicon carbide constitutes about 50 to about 60 percent of the weight of each tile 30. The above processing technique is generally known in the art. Furthermore, numerous other methods are known for forming ceramic composite materials, any of which may potentially be suitable for forming the tiles 30 of this invention.

An advantage of the preferred silicon carbide/aluminum oxide composite material, as well as many other ceramic materials, is its relatively low density compared to steels. Generally, the preferred material for the tiles 30 has a density of about ⅓ that of steel. In practice, tiles 30 formed from the preferred composite material are able to withstand the impact of a projectile as well as steel plates of greater thicknesses. As a result, the barrier 20 contributes minimal additional weight to the turbofan engine for a given degree of protection.

Generally, the shape of the tiles 30 is limited only by the size of the area to be covered by the barrier 20, and the ability of the tiles 30 of a given shape to uniformly distribute a localized impact. As shown, the tiles 30 are generally rectangular and extend the entire axial length of the forward section 10b of the containment casing 10. Alternatively, the tiles 30 could have a square shape, with a number of tiles 30 being abutted end to end to take the place of the single tile 30 shown in FIG. 3. When formed from the preferred silicon carbide/aluminum oxide composite, a suitable size for the tiles 30 is about 10 by 15 centimeters. In practice, the required thickness of the tiles 30 has been determined empirically, and may vary widely from as low as about 2 millimeters to as thick as the containment casing 10. Tiles 30 having thicknesses within this range have been empirically determined to sufficiently protect the underlying containment casing 10 by distributing and deflecting a highly localized impact, even though the tile 30 is shattered by the impact. However, it is foreseeable that the dimensions of the tiles 30 can be substantially altered and yet achieve the capability desired by this invention.

After forming, the tiles 30 are preferably adhered to the interior surface of the forward section 10b of the containment casing 10 with a suitable adhesive 24. While numerous adhesives are potentially suitable, a preferred adhesive is a polysulfide adhesive of the type known in the art. Such adhesives are preferred in that they are capable of high strain which occurs as a result of temperature differentials and different coefficients of thermal expansion for the tiles 30 and the containment casing 10. In addition, the adhesive's ability to withstand high strain serves to enhance the ballistic capability of the barrier 20. With the tiles 30 secured in place with the adhesive 24, the acoustic liner 18 can be bolted in place in a conventional manner, as shown in FIG. 2.

In use, if a fan blade 12 is released and propelled into the forward section 10b of the containment casing 10, one or more of the tiles 30 will bear the brunt of the impact in a manner that tends to distribute the force of the impact over a greater surface area. In addition, the hardness of the tiles 30 enables the tiles 30 to resist the cutting action of the fan blade 12, as well as serves to dull the edge of the fan blade 12 so as to further minimize damage inflicted by the fan blade 12 on other tiles 30, the containment casing 10 and the engine. Typically, damage to the tiles 30 is severe to the extent that the tiles 30 are shattered. In addition, the containment casing 10 will typically be considerably distorted to the extent that it must be replaced. However, in accordance with this invention, the fan blade 12 will remain contained within the containment casing 10, such that damage to the aircraft itself will be substantially if not completely avoided.

As noted previously, though the barrier 20 of this invention has been described as being located at the forward section 10b of the containment casing 10, it is foreseeable that the aft section 10a of the containment casing 10 could be similarly protected. In addition, other regions of a turbofan engine, as well as various regions of other types of turbomachinery, could be protected in accordance with this invention.

Therefore, while my invention has been described in terms of a preferred embodiment, it is apparent that other forms could be adopted by one skilled in the art. Accordingly, the scope of my invention is to be limited only by the following claims.

The embodiments of the invention in which an exclusive property or privilege is claimed are defined as follows:

1. A blade containment structure for a turbomachine having a plurality of blades mounted to a hub disposed within the blade containment structure, the blade containment structure comprising:
   a metallic containment casing;
   a portion defining an interior surface of the containment casing; and
   barrier means secured to the interior surface of the containment casing for distributing the force of an impact from a blade released from the hub, the barrier means being formed from a material which is harder than the material of the metallic containment casing such that the barrier means is resistant to being pierced by a corner of the blade and able to dull the corner of the blade upon impact, the barrier means having a substantially uninterrupted interior surface so as to form a continuous barrier layer in order to ensure that, upon release of the blade, the corner of the blade will initially impact the barrier means;
   whereby the barrier means promotes the ability of the metallic containment casing to withstand the impact from the blade and contain the blade when the blade is released into the blade containment structure.

2. A blade containment structure as recited in claim 1 wherein the portion is displaced axially from the plurality of blades.

3. A blade containment structure as recited in claim 1 wherein the barrier means comprises a plurality of tiles which circumferentially form the continuous barrier layer over the interior surface.

4. A blade containment structure as recited in claim 1 wherein the barrier means is formed from a ceramic composite material.

5. A blade containment structure as recited in claim 1 further comprising an acoustic liner secured over the barrier means such that the barrier means is disposed between the interior surface and the acoustic liner.

6. A blade containment structure as recited in claim 1 wherein the turbomachinery is a gas turbine engine and the portion defines the interior surface of the blade containment structure which is forward of a plurality of fan blades within the gas turbine engine.

7. A metallic containment casing for a turbofan engine having a plurality of fan blades mounted to a hub disposed within the containment casing, the containment casing comprising:
   a portion defining an interior surface of the containment casing which is axially forward of the plurality of fan blades; and
   a plurality of barrier members secured to the interior surface for distributing the force of an impact from a fan blade released from the hub, the plurality of barrier members being composed of a material which is harder than the material of the metallic containment casing, the plurality of barrier members forming a ballistic barrier which is resistant to being pierced by a corner of the fan blade and which is able to dull the corner of the fan blade upon impact, the plurality of barrier members circumferentially abutting to form a substantially uninterrupted interior surface which form a continuous barrier layer in order to ensure that, upon release of the fan blade, the corner of the fan blade will initially impact the plurality of barrier members;

whereby the plurality of barrier members promote the ability of the metallic containment casing to withstand the impact from the fan blade and contain the fan blade when the fan blade is released into the containment casing.

8. A containment casing as recited in claim 7 wherein the plurality of barrier members comprise a plurality of tiles which form the continuous barrier layer over the interior surface.

9. A containment casing as recited in claim 7 wherein the plurality of barrier members are formed from a ceramic composite material.

10. A containment casing as recited in claim 7 wherein the plurality of barrier members are formed from a silicon carbide/aluminum oxide composite material.

11. A containment casing as recited in claim 7 wherein the plurality of barrier members are formed from a material having a thickness of at least about 2 millimeters.

12. A containment casing as recited in claim 7 wherein the plurality of barrier members are secured to the interior surface with a polysulfide adhesive.

13. A containment casing as recited in claim 7 further comprising an acoustic liner secured over the plurality of barrier members such that the plurality of barrier members are disposed between the interior surface and the acoustic liner.

14. A turbofan engine having a plurality of fan blades mounted to a hub disposed within a metallic containment casing, the turbofan engine comprising:

a forward portion of the containment casing displaced axially forward from the plurality of fan blades, the forward portion defining an interior surface of the containment casing;

a plurality of barrier tiles secured to the interior surface of the forward portion for distributing the force of an impact from a fan blade released from the hub, the plurality of barrier tiles being composed of a ceramic composite material, the plurality of barrier tiles forming a ballistic barrier which is resistant to being pierced by a corner of the fan blade and which is able to dull the corner of the fan blade upon impact, the plurality of barrier tiles being abutted side by side along the circumference of the interior surface so as to form a continuous barrier layer in order to ensure that, upon release of the fan blade, the corner of the fan blade will initially impact the plurality of barrier tiles; and an acoustic liner secured over the plurality of barrier tiles such that the plurality of barrier tiles are disposed between the interior surface and the acoustic liner;

whereby the plurality of barrier tiles promote the ability of the metallic containment casing to withstand the impact from the fan blade and contain the fan blade when the fan blade is released into the forward portion of the containment casing.

* * * * *